July 5, 1966

R. G. MARZOLF ET AL 3,259,864

COIL CONSTRUCTION AND MEANS FOR
LOCKING THE LEADS THEREON
Filed June 26, 1963

ROBERT G. MARZOLF AND
MAX E. LAUTNER
INVENTORS

BY Richard von K. Bruns
Atty.

United States Patent Office 3,259,864
Patented July 5, 1966

3,259,864
COIL CONSTRUCTION AND MEANS FOR LOCK-
ING THE LEADS THEREON
Robert G. Marzolf and Max E. Lautner, Watertown, N.Y.,
assignors to Bomax, Inc., Watertown, N.Y., a corporation of New York
Filed June 26, 1963, Ser. No. 290,681
4 Claims. (Cl. 336—192)

This invention relates to a coil bobbin having means for locking lead wires thereto, and to a method for quickly and securely locking the connected coil ends and lead wires to the bobbin.

Bobbins on which the coils of electric motors are wound must be provided with means for locking the lead wires to the bobbin so that when the coil is moved from place to place the comparatively fine start and finish wires of the winding, to which the lead wires are connected, will not be broken by carrying the coil suspended from the lead wires. This is especially important in small subfractional horsepower motors such as those used in electric typewriters, electric heaters and the like, where the whole motor may frequently be lifted by the lead wires.

Locking of the lead wires to the bobbin is conventionally accomplished by manually threading the lead wires in shoe-lace fashion through holes in the bobbin. This hand operation is time-consuming and provides only frictional engagement between lead wires and bobbin. Frequently the lead wires become loosened or are moved in their holes so that, when the motor is picked up by the lead wires, a strain is put on the fine wire of the coil start and finish wires resulting in breaking the electrical connection to the coil winding or in movement of the connection between lead wires and the coil winding which may cause a short circuit.

The principal object of the present invention is to provide means for securely anchoring the lead wires to the bobbin so that no strain can be put on the core winding.

Another important object is to provide means for locking the lead wires to the bobbin, and at the same time disposing the start and finish wires and their electrical connections with the lead wires in a secure and protected position.

A further object is to provide a method of locking a lead wire to the bobbin, electrically connecting lead wire and winding, and securing the electrical connection in an operation which is quickly and easily performed.

Other objects and advantages will become apparent from the following description taken in conjunction with the accompanying drawing, in which.

Figure 4:
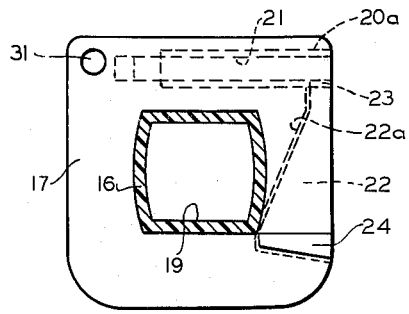
Figure 2:
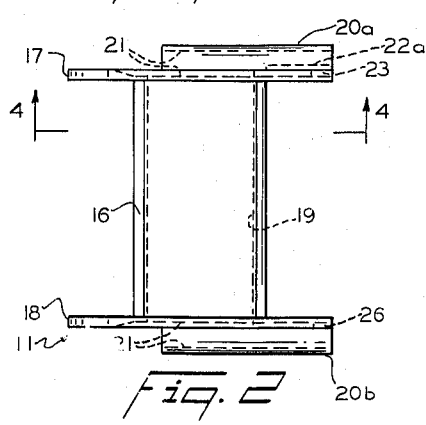
FIGURE 2 is an enlarged elevational view of the bobbin thereof.
Figure 6:
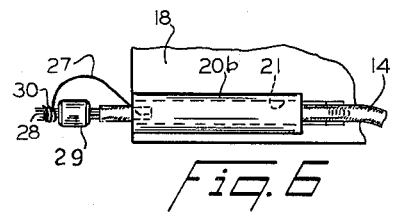
Figure 7:
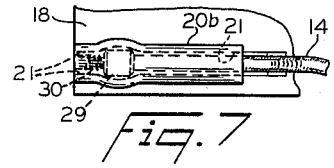
Figure 5:
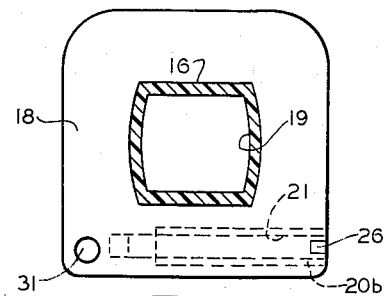
Figure 3:
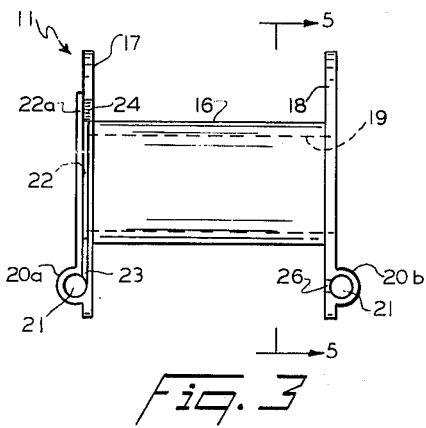
FIGURE 3 is an enlarged elevational view of the bobbin as viewed in FIG. 1.

FIGURES 4 and 5 are sectional views on lines 4—4 and 5—5 of FIGS. 2 and 3, respectively;

FIGURE 6 is a fragmentary end view of the coil just prior to securing the lead wire in its lock; and FIGURE 7 is a view similar to FIG. 6 showing the lead wire locked to the bobbin.

In the drawings, the coil 10 comprises a bobbin 11, having an insulated wire winding 12 thereon, and insulated lead wires 13 and 14 connected to the ends of the winding 12. Insulating tape 15 may be wound about the perimeter of the winding for protection.

Figure 1:
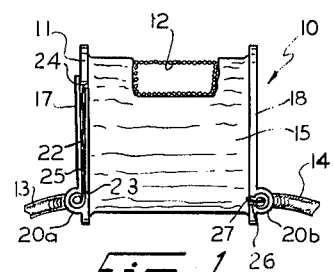
FIGURE 1 is a side elevational view of a coil according to the invention.

The bobbin 11 is formed of nylon or other material having good electrical insulating properties and which becomes relatively soft and stretchable when heated. Bobbin 11 has a hollow spool portion 16 and two end flanges 17 and 18, the winding being wound about spool 16 between the end flanges as indicated in the cut-away portion of FIGURE 1.

A passage 19 extends axially from end to end of the bobbin, and it will be understood that a metal core is provided in this passage when the coil is assembled in a motor.

Flanges 17 and 18 are provided with locking tubes 20a and 20b, respectively. The locking tubes 20a, 20b are formed integral with the flanges, and each extends along one side of its flange from one edge thereof toward the opposite edge. Each tube 20a, 20b has a passage 21 therethrough, a part of which passage may be formed in the flange itself as shown.

Flange 17 is provided with a slot 22 (FIGS. 3 and 4) formed edgewise in the flange and extending in a direction normal to the axis of the bobbin. Flange 17 may be thickened at 22a (FIGS. 3 and 4) in the region of slot 22. Slot 22 is connected at one end to passage 21 in tube 20a through an aperture 23 (FIGS. 2 and 4). At its other end, slot 22 is connected to the space normally occupied by winding 12 through an aperture 24 extending axially of the bobbin through a portion of the wall of flange 17. Aperture 24 may conveniently be a pie-shaped slot, as best seen in FIGURE 4 extending from the edge of flange 17 to the level of the spool portion 16 of the bobbin.

Start wire 25 (FIG. 1) normally lies in slot 22 and extends through aperture 24 so that the winding 12 may be machine wound on spool 16 without insulation between the start wire and the rest of winding 12.

Flange 18 is provided with an aperture 26 (FIGS. 3 and 5) connecting passage 21 in the locking tube 20b with the space normally occupied by winding 12. Finish wire 27 (FIG. 1) of the coil normally lies in aperture 26 which extends inwardly in flange 18 to the level on the spool normally occupied by the outer layer of winding 12, see FIG. 5. Finish wire 27, accordingly, may be led directly from winding 12 through aperture 26 to the connection with lead wire 14.

In connecting lead wire 13 with start wire 25 and lead wire 14 with finish wire 27, the initial step is the insertion of the insulated lead wire through passage 21 as shown in FIGURE 6 which illustrates the finish wire connection. The stripped end 28 of the lead wire extends out from tube 20b and as obstruction element in the form of a metal collar or sleeve 29 having a close sliding fit with the stripped end 28 is slipped over it. Sleeve 29 is rounded at its ends and is dimensioned to have an interference fit in passage 21. The finish wire 27 (or start wire 25) is then wrapped around end 28 at 30 to retain the sleeve 29 on the lead wire, and any unneeded ends of wires 25, 27, or 28 may be snipped off.

FIGURE 6 shows sleeve 29 spaced from the lead wire insulation and from the wrapped around portion 30 of wire 27 for clarity in the drawing, but it will be understood that the sleeve may be held against the insulation by wrap-around portion 30. Portion 30 is then exposed to a flame or other heat sufficient to burn the enamel insulation from the wires. This heat is more than sufficient to melt solder so that when the portion 30 is touched with solder or dipped and allowed to cool a good soldered electrical connection is made between wire 25 or 27 and its respective lead wire and also the sleeve 29 is secured on end 28 by a soldered connection.

When the solder first congeals, the lead wire may be pulled manually back into tube 20b. Sleeve 29 remains sufficiently hot to heat the tube and soften it. By manual tension on the lead wire, the sleeve and the wrap-around portion 30 are pulled into passage 21, as shown in FIGURE 7, the tube 20b being stretched around the sleeve. When the sleeve 29 is again cool the lead wire is locked in its tube 20b by the constriction of the stretched portion of the tube. This constrictive pressure is more than sufficient to withstand a thirty pound pull on the lead wire as required by underwriters in the case of such small electric motors.

It will be apparent that sleeve 29 may be secured by crimping or otherwise to the terminal wire end 28, but, since a soldered connection between the start or finish wire and the lead wire is desirable, the simple soldered connection of the sleeve to the wire end 28 is preferred.

It will now be apparent also that by wrapping portion 30 of the start wire 25 or finish wire 27 about the end 28 of the lead wire at a point close to the tube 20a, 20b, the start wire 25 will be pulled into aperture 23 and the finish wire pulled into aperture 26 when the lead wire end 18 and its sleeve 29 are drawn into passage 21 in the locking tube. Start wire 25 and finish wire 27 are therefore disposed and secured in passages protected by the flanges 17 and 18.

Holes 31 may be provided in flanges 17 and 18, as shown in FIGURES 4 and 5, for threading the free ends of lead wires 13 and 14 therethrough, if desired.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. An electric motor coil comprising: a bobbin having a flange at either end, a wire winding on said bobbin between said flanges and having start and finish wires extending therefrom, a locking tube of insulating material secured along its length on a flange for each start and finish wire, each tube having a passage therethrough, an insulated lead wire extending from each tube, the lead wire for each tube having a stripped end portion lying in said passage, a collar mechanically secured around said end portion and having an interference fit in said passage, said start and finish wires being each electrically connected to a respective one of said lead wire end portions within a tube passage, said connection preventing withdrawal of said end portion through the collar, said connection being at the stripped end of the lead wire and said collar being between the connection and the lead wire extension out of the tube, said locking tubes being of heat-softenable material, said collars being of metal adapted to be forced into said tubes when hot for locking the lead wires to the bobbin.

2. A coil for a small electric motor comprising: a hollow bobbin of electrical insulating material having end flanges, a winding of insulated wire on the bobbin between the flanges, said flanges having apertures therein, a start wire and a finish wire extending from said winding and lying respectively in a different one of said apertures, a pair of tubular locks each fixed on a flange exterior of said winding, each tubular lock having a passage therethrough opening adjacent a respective one of said apertures, an insulated terminal wire extending from each of said tubular locks, each terminal wire having a stripped end portion in said passage electrically connected to a respective one of said start and finish wires, and a metal sleeve mechanically secured on each of said terminal wire end portions, said sleeves having an interference fit in said passages and being forced therein for locking the terminal wires to the bobbin said electrical connections being disposed between the sleeve and the stripped end of the respective lead wire for preventing withdrawal of the end portions from the sleeves by strain on the lead wire.

3. A coil for a sub-fractional horsepower motor comprising: a bobbin having end flanges, a winding of comparatively small diameter insulated wire on the bobbin between the flanges, said winding having a start wire and finish wire extending from the body of the winding, said end flanges having apertures through which said start and finish wires pass and protrude from the end of the bobbin, a pair of locking tubes of heat expandible material fixed on said flanges, said locking tubes each having a passage therethrough extending from a point on the flange adjacent the protruding end of one of said start and finish wires, a comparatively large diameter insulated terminal wire in each of said passages and extending therefrom, each terminal wire having a stripped end electrically connected respectively to one of said start and finish wires, and a metal sleeve secured around each of said ends said sleeves being dimensioned for an interference fit in said passages and having been forced down into said passages when hot to stretch said tubular portions therearound, whereby strain between said coil and terminal wires is carried by each electrical connection between coil wire and terminal wire end being disposed between the terminal wire end and the sleeve for securing the terminal wire end to the sleeve, said tubular portions and said start and finish wires are free of strain.

4. A coil for small electric motors, comprising: a bobbin of electric insulating material which is stretchable when heated, said bobbin having a hollow spool portion with outwardly extending flanges at either end, a wire winding on said spool portion between said flanges, a start wire and a finish wire extending from said winding, said flanges each having a locking tube formed thereon, each locking tube having a passage therethrough the entrance end of which is spaced from the perimeter of the flange, an insulated lead wire extending from the exit end of each tube passage, each lead wire having an end in its respective passage electrically connected to one of said start and finish wires, a slot in one flange disposed edgewise of the flange, one end of said slot having an opening adjacent said spool and the other end of the slot having an opening extending to the entrance end of one locking tube passage, said start wire lying in said slot, the other flange having an aperture therethrough extending from said winding to the entrance end of the other locking tube passage, said finish wire lying in said aperture, and each of said lead wire ends having a metal collar mechanically secured thereon within its tube passage, each collar being dimensioned for an interference fit in the passage and forced into the passage when hot so as to lock said lead wires in said tubes.

References Cited by the Examiner

UNITED STATES PATENTS

| | | | |
|---|---|---|---|
| 1,502,194 | 7/1924 | Hibbard | 310—194 |
| 1,704,151 | 3/1929 | Simpson | 336—192 |
| 2,517,105 | 8/1950 | Greer | 310—194 |
| 2,898,396 | 8/1959 | Watson | 174—77 X |
| 2,999,962 | 9/1961 | Wahl | 336—192 X |
| 3,043,903 | 7/1962 | Keane et al. | 310—71 X |
| 3,047,935 | 8/1962 | Reichelt | 29—155.57 |
| 3,071,846 | 1/1963 | Wesolowski | 29—155.57 |
| 3,083,930 | 4/1963 | Brekke | 336—198 X |

ROBERT K. SCHAEFER, *Primary Examiner.*

MILTON O. HIRSHFIELD, *Examiner.*

J. J. SWARTZ, D. J. BADER, *Assistant Examiners.*